US008212829B2

(12) United States Patent  
Kim

(10) Patent No.: US 8,212,829 B2
(45) Date of Patent: Jul. 3, 2012

(54) COMPUTER USING FLASH MEMORY OF HARD DISK DRIVE AS MAIN AND VIDEO MEMORY

(75) Inventor: Hee-jo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1203 days.

(21) Appl. No.: 11/520,013

(22) Filed: Sep. 13, 2006

(65) Prior Publication Data

US 2007/0067561 A1    Mar. 22, 2007

(30) Foreign Application Priority Data

Sep. 16, 2005   (KR) .................. 10-2005-0086935

(51) Int. Cl.
    *G06T 1/60*    (2006.01)
(52) U.S. Cl. ........................................ 345/530; 345/547
(58) Field of Classification Search .................. 345/530, 345/547
    See application file for complete search history.

(56) References Cited

U.S. PATENT DOCUMENTS

| 5,778,418 | A  | * | 7/1998  | Auclair et al. ............... 711/101 |
| 5,860,083 | A  | * | 1/1999  | Sukegawa ..................... 711/103 |
| 6,026,465 | A  | * | 2/2000  | Mills et al. .................... 711/103 |
| 6,487,669 | B1 | * | 11/2002 | Waring .......................... 713/324 |
| 6,754,733 | B2 | * | 6/2004  | Hansen .......................... 710/22 |
| 7,006,318 | B2 |   | 2/2006  | Stence et al. |
| 7,165,170 | B2 | * | 1/2007  | Rothman et al. ................ 713/1 |
| 2004/0042112 | A1 | * | 3/2004 | Stence et al. .................... 360/69 |
| 2004/0117587 | A1 |   | 6/2004 | Arimilli et al. |
| 2005/0270280 | A1 | * | 12/2005 | Riback et al. ................ 345/204 |

FOREIGN PATENT DOCUMENTS

| JP | 8-63396       | 3/1996 |
| JP | 2004-70467    | 3/2004 |
| JP | 2004-192615   | 7/2004 |
| KR | 2001-35845    | 5/2001 |
| KR | 2005-57006    | 6/2005 |
| WO | WO/2004/021350 | 11/2004 |

OTHER PUBLICATIONS

Office Action issued by Korean Intellectual Property Office in Korean Patent Application No. 2005-86935 on Sep. 27, 2006.
Microsoft Support, "How Windows 95 Manages Virtual Memory" Feb. 2, 2002 http://support.microsoft.com/kb/128327/en-us?FR=1 &PA=1&SD=HSCH, Article I.D. No. 128327, accessed Jul. 5, 2006.

* cited by examiner

*Primary Examiner* — Maurice L McDowell, Jr.
(74) *Attorney, Agent, or Firm* — Jefferson IP Law, LLP

(57) ABSTRACT

A computer includes a processing unit; a hard disk drive having a main memory region on and from which processing information used in correspondence to processing procedures of the processing unit is directly written and read; a control unit which communicates with the hard disk drive at high speed, for controlling the writing and reading for the hard disk drive; and a communications bus which connects between the hard disk drive and the control unit so that the hard disk drive and the control unit can communicate with each other at high-speed. Accordingly, there is provided a computer which effectively overcomes the limit on a memory storage capacity, and saves the space of a mainboard and reduces the weight thereof.

39 Claims, 4 Drawing Sheets

COMPUTER USING FLASH MEMORY OF HARD DISK DRIVE AS MAIN AND VIDEO MEMORY

CROSS-REFERENCE TO RELATED APPLICATION

This application claims the benefit of Korean Patent Application No. 2005-86935, filed on Sep. 16, 2005 in the Korean Intellectual Property Office, the disclosure of which is incorporated herein by reference.

BACKGROUND OF THE INVENTION

1. Field of the Invention

Aspects of the present invention relate to a computer, more particularly, to a computer which effectively overcomes the limit on a memory storage capacity, saves the space of a mainboard, and decreases the weight thereof.

2. Description of the Related Art

A general computer includes a CPU (Central Processing Unit), a main memory, a BIOS ROM, and a hard disk drive (HDD) that are memory devices, etc. The main memory is mutually connected with the CPU through a main bus called a host bus. Also, the hard disk drive (HDD) is mutually connected with the CPU through a general-purpose input-output bus (for example, PCI, IDE BUS, etc.).

Referring to FIG. 1, a conventional computer will be briefly described. As shown in FIG. 1, the conventional computer includes a CPU 1, a graphics memory control hub (hereinafter called GMCH) 2 which communicates with a display module 3 and a main memory 4 while being connected with the CPU 1, via a host bus (HOST BUS). An input/output control hub (hereinafter called ICH) 5 communicates with a peripheral component interconnection (PCI) controller 6, a USB controller 7, a LAN controller 8, a BIOS ROM 9, an IO controller 10, and an IDE controller 11 while being connected with the GMCH 2 via a PCI bus (PCI BUS). The IDE controller 11 plays a role of functioning as an interface between the ICH 5 and a hard disk drive (HDD) 12. The HDD 12 is an auxiliary storage device.

As shown in FIG. 1, the main memory 4 and the HDD 12 are effectively managed through a memory management unit including the GMCH 2, the ICH 5, etc. That is, the memory management unit including the GMCH 2 and the ICH 5 is operated under the control of the CPU 1 and performs writing and reading operations for the main memory 4 and the HDD 12.

The GMCH 2 performs function of a video controller (not shown) and controls the display module 3. The main memory 4 has a video memory region on and from which video information, such as graphic images and data for handling 3D images, is written and read, respectively, and which is used in correspondence to an image processing procedure of the GMCH 2 in addition to the processing information corresponding to the information processing procedure of the CPU 1.

Recently, while the computer industry is remarkably developing, the task which handles large-capacity processing information or video information gradually increases. However, the above-described conventional computer has been confronted by many restrictions on the storage capacity at the time of implementing the main memory 4. Moreover, according to the size of the mainboard on which the main memory 4 is mounted, the conventional computer has the limitation on the implementation thereof. Also, the conventional computer has the limitation on active countermeasures to memory types, which are rapidly changed and modified.

SUMMARY OF THE INVENTION

Aspects of the present invention provide a computer which effectively overcomes the limit on a memory storage capacity, saves the space of a mainboard and/or reduces the weight thereof.

According to an aspect of the present invention, a computer comprises: a processing unit; a hard disk drive having a main memory region on and from which processing information used in correspondence to processing procedures of the processing unit is directly written and read; a control unit which communicates with the hard disk drive at high speed, for controlling the writing and reading for the hard disk drive; and a communications bus which connects between the hard disk drive and the control unit so that the hard disk drive and the control unit can communicate with each other at high-speed.

According to an aspect of the present invention, the hard disk drive comprises a built-in flash memory.

According to an aspect of the present invention, the main memory region is provided in the flash memory.

According to an aspect of the present invention, the flash memory comprises: a plurality of memory regions which can be corrected in units of a block, as non-volatile memories including the main memory region; and a controller controlling information stored in the main memory region among the plurality of memory regions through high-speed mutual communications with the control unit.

According to an aspect of the present invention, the control unit is a graphics memory control hub (GMCH) which is connected to the hard disk drive through the communications bus to communicate with the controller at high speed and to be accessed to the controller according to all operations of the processing unit.

According to an aspect of the present invention, the computer further comprises a video processing unit for processing video signals, wherein the plurality of memory regions comprises a video memory region on and from which video information used in correspondence to image signal processing procedure of the video processing unit is written and read, respectively.

According to an aspect of the present invention, the control unit further comprises a video processing unit for processing video signals, wherein the plurality of memory regions comprises a video memory region on and from which video information used in correspondence with an image signal processing procedure of the video processing unit is directly written and read, respectively.

According to an aspect of the present invention, the control unit accesses the controller under the control of the video processing unit.

According to an aspect of the present invention, the controller controls the information stored in at least one of the main memory region and the video memory region in the plurality of memory regions through high-speed mutual communications with the control unit.

According to an aspect of the present invention, the computer further comprises an input/output control hub (ICH) interconnecting input signals between various neighboring peripheral devices in the computer, wherein the controller is connected to the input/output control hub through IDE communications, to thereby control the information stored in the plurality of memory regions through communications with the input/output control hub.

It is to be understood that both the foregoing general description and the following detailed description are exemplary and explanatory and are intended to provide further explanation of the invention as claimed. Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF THE EMBODIMENTS

Figure 1:
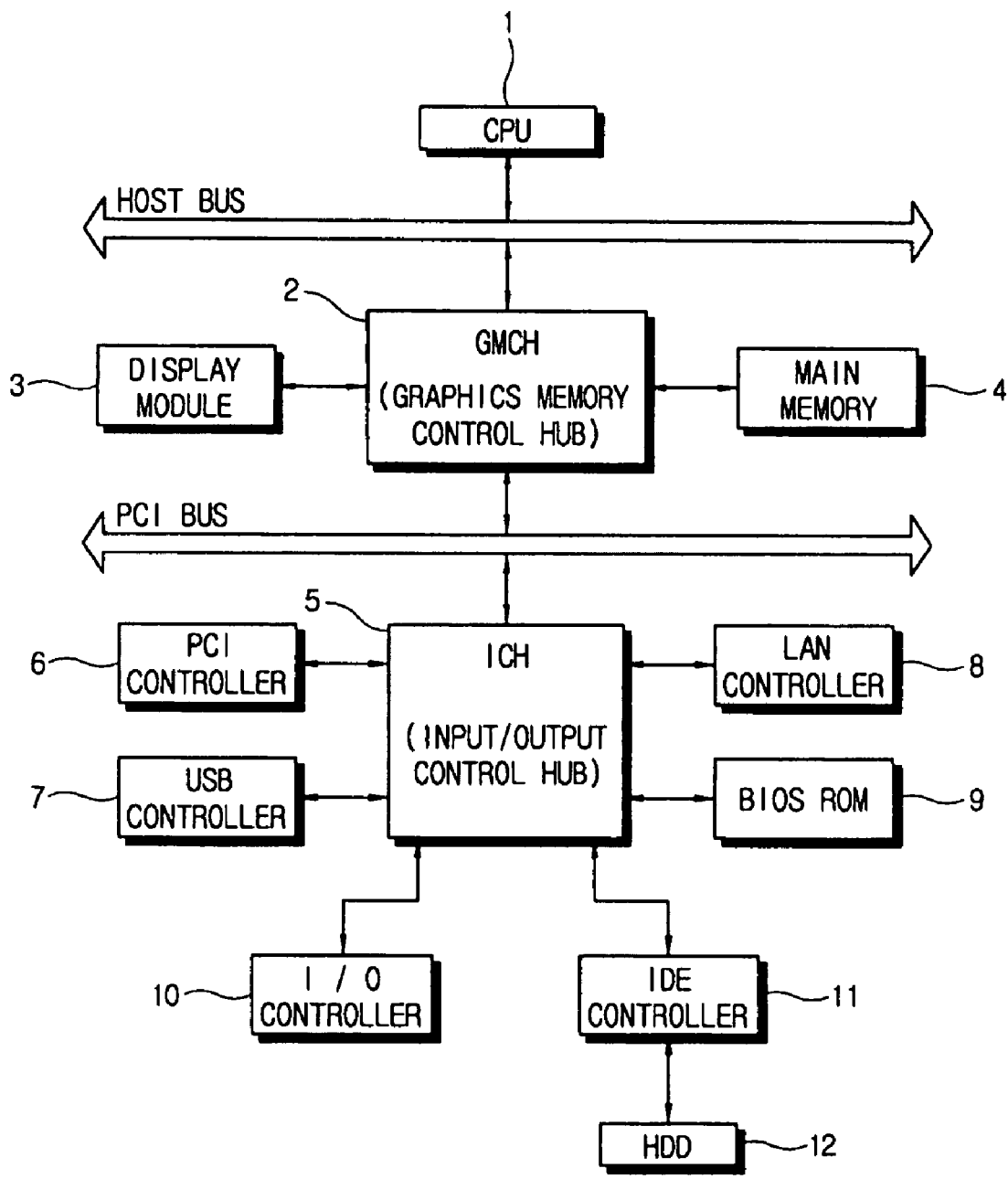
FIG. 1 is a control block diagram of a conventional computer.

Reference will now be made in detail to exemplary embodiments of the present invention, examples of which are illustrated in the accompanying drawings, wherein like reference numerals refer to like elements throughout. The embodiments are described below in order to explain examples of the present invention by referring to the figures.

Figure 2:
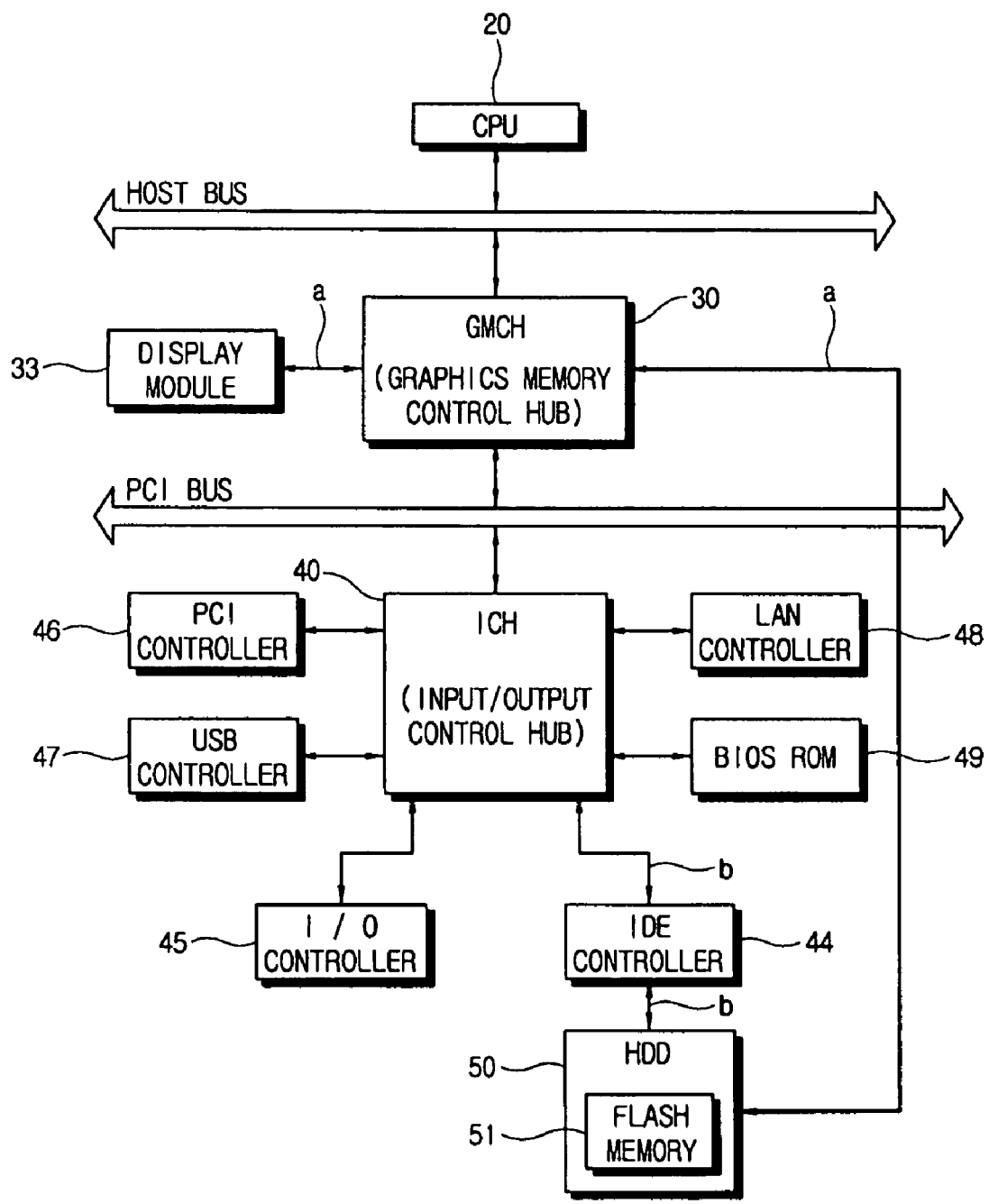
FIG. 2 is a control block diagram of a computer according to an embodiment of the present invention.

FIG. 2 is a control block diagram of a computer according to an embodiment of the present invention. As shown in FIG. 2, a computer includes a CPU 20 which is a processing unit. A graphics memory control hub (hereinafter called GMCH) 30 communicates with a display module 33 and a hard disk drive (hereinafter called HDD) 50 while being connected with the CPU 20 via a host bus (HOST BUS). An input/output control hub (hereinafter called ICH) 40 communicates with a peripheral component interconnection (PCI) controller 46, a USB controller 47, a LAN controller 48, a BIOS ROM 49, an IO controller 45, and an IDE controller 44 while being connected with the GMCH 30 via a PCI bus (PCI BUS). As shown, the computer includes a high-speed communications bus "a" which connects between the HDD 50 and the GMCH 30 to perform high-speed mutual communications between the HDD 50 and the GMCH 30.

The CPU 20 performs all operations to execute an operating system program or application programs mounted in the computer, as the central processing unit. For example, the CPU 20 controls the GMCH 30 in order to access the operating system program or the loaded application programs in the HDD 50.

The GMCH 30 is a control unit and is a graphics memory control hub including a function of a memory control hub (MCH) to perform a conventional memory-related interface (not shown), and a function of a video processing unit (not shown), and thus performs an interface with the HDD 50 and the display module 33. The GMCH 30 connects with the HDD 50 at high speed via a high-speed communications bus "a" and accesses the HDD 50 under the control of the CPU 20. That is, according to operations of the CPU 20, the GMCH 30 accesses the HDD 50 connected through the high-speed communications bus "a" in order to directly write and read processing information corresponding to information processing procedures of the CPU 20 on and from the HDD 50.

Moreover, the GMCH 30 performs a function of a video processing unit (not shown) to control the display module 33. Also, the GMCH 30 can access the HDD 50 connected through the high-speed communications bus "a" according to the function of the video processing unit (not shown). That is, as the GMCH 30 performs the function of the video processing unit (not shown), the GMCH 30 accesses the HDD 50 connected through the high-speed communications bus "a" in order to directly write and read video information such as graphic images, and programs and frame data for handling 3D images in correspondence to the image processing procedure. As shown, the display module 33 is called an image processing device for processing external and internal image signals. While not required in all aspects, the display module 33 may include an image processor (not shown) for processing the image signals, a display panel (not shown) on which video images are displayed, and a panel driver for processing the video signals inputted from the image processor (not shown) and displaying the video images on the display panel (not shown). The display module 33 can be integrated into the computer, as in a portable computer, or be external to the computer in aspects of the invention.

While not required in all aspects, the image processor (not shown) can include a scaler (not shown) scaling the image signal, and a signal converter converting the input video signal into a video signal which can be processed by the scaler (not shown). In this aspect of the invention, according to the kind of the video signal to be converted into the video signal to be processed by the scaler, the signal converter (not shown) may include a TMDS (Transition Minimized Differential Signaling) receiver, an A/D converter, a video decoder and tuner etc., in various forms.

The ICH 40 is an input/output control hub interconnecting various neighboring peripheral devices in the inside of the computer. For example, the peripheral devices can be the PCI controller 46, the USB controller 47, the LAN controller 48, the BIOS ROM 49, the IO controller 45, and the IDE controller 44. The ICH 40 accesses the HDD 50 by the interfacing function of the IDE controller 44, which is connected with a low-speed communications bus (hereinafter called an IDE bus) "b," which enables relatively low-speed communications in comparison with the high-speed communications bus "a". Here, the ICH 40 and the IDE controller 44 are separately shown in this embodiment. However, this example is but one embodiment. In another embodiment, the ICH 40 includes the hard disk controller function of the IDE type of the IDE controller 44, for example, in order to control the writing/reading operations of the HDD 50. Additionally, it is understood that other peripheral devices can be used instead of or in addition to the shown devices, such as a printer, wireless network interfaces, IEEE 1394 interfaces, cameras, and other like devices. Additionally, the peripheral devices can include drives to other media, such as portable audio devices, detachable hard drives and flash memory, SD drives, optical and/or magnetic media drives and other like drives.

By way of example, the low speed communication of bus "b", as compared to the high speed of bus "a," means that the communication speed is lower than the access speed of the flash memory 51 and/or the HDD 50. According to an aspect of the invention, the bus "b" having the low speed communication can be implemented using a Flash memory chip having an inherent low speed characteristic for the low speed communication of IDE controller 44 with the flash memory 51. According to another aspect of the invention, the bus "b"

having the low speed communication can be implemented using the existing HDD 50 or the combination of flash memory 51 and the HDD 50 to lower the speed by a signal buffering function of the HDD 50.

Figure 4:
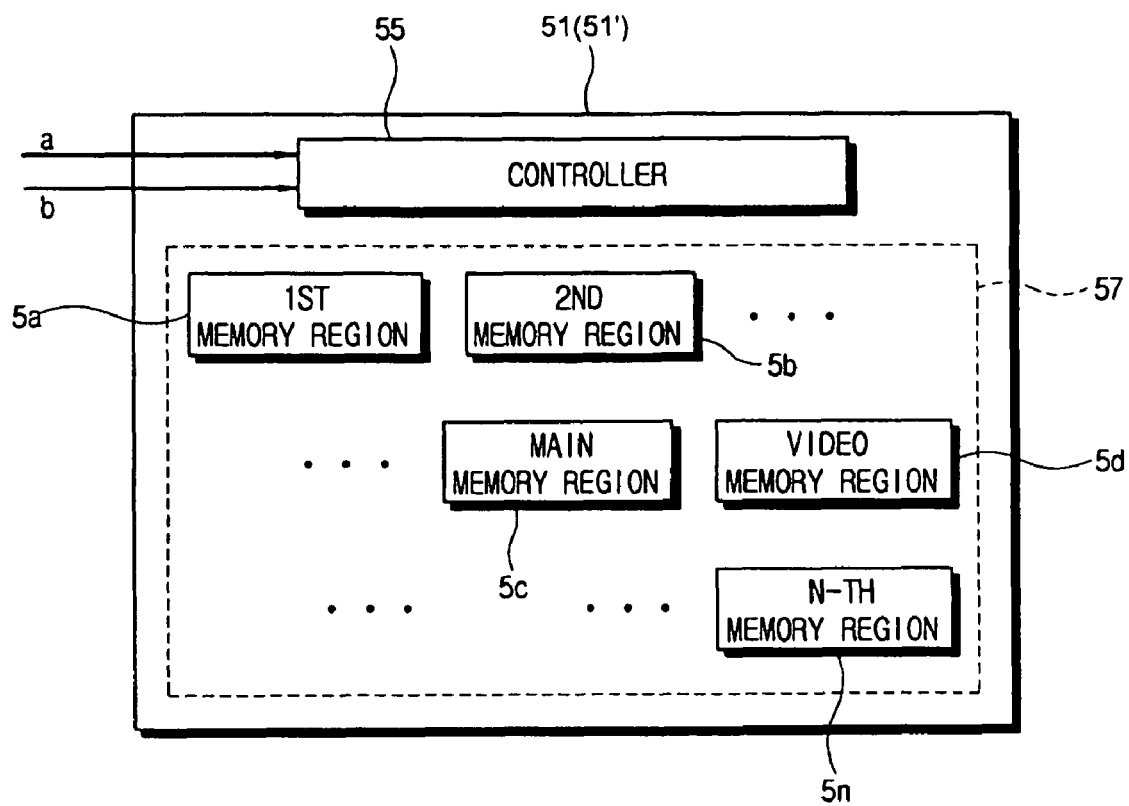
FIG. 4 is a simple configuration diagram of a flash memory for a computer according to an embodiment of the present invention.

The shown HDD 50 is a hard disk drive which performs a function of a conventional main memory 4 of FIG. 1, and a function of a conventional hard disk drive (HDD) 12 of FIG. 1. As shown in FIG. 2, the HDD 50 includes a flash memory 51. Here, referring to FIG. 4, the flash memory 51 will be described. The flash memory 51 as a non-volatile memory includes a plurality of memory regions 57 (shown in FIG. 4) which can be corrected in units of a block, and a controller 55 controlling information stored in at least one of a main memory region 5c and a video memory region 5b among the plurality of memory regions 57 by the GMCH 30 connected via the high-speed communications bus "a". The flash memory 51 can be removable media in aspects of the invention. Additionally, while shown as a flash memory 51, it is understood that the memory 51 can be other types of memories, such as an SDRAM or combinations thereof.

According to an aspect of the invention, in order to execute the high speed communication between the GMCH 30 and the flash memory 51 of the HDD 50, the speed of the bus "a" needs to account for the low operating speed of shown flash memory 51. According to an aspect of the invention, an embodiment of the bus "a" uses a high speed chip having a function increasing the cache hit rate for the high speed communication of the GMCH 30 with the flash memory 51. Where the high speed communication is required only in a part, an embodiment of the invention uses a high speed chip designed to control only SDRAM or the combination of the flash memory 51 and the SDRAM in the part.

The plurality of memory regions 57 includes a first memory region 5a, a second memory region 5b, . . . , the main memory region 5c, the video memory region 5d, . . . , and a n-th memory region 5n, on and from which predetermined information is written and read, respectively. Here, the main memory region 5c is a region which is provided to perform the function of the conventional main memory 4 of FIG. 1. For example, an operating system program or application programs are loaded in the main memory region 5c from another of the regions 57 in which the program is stored prior to use, by the processing of the CPU 20 when the computer is booted up. Also, the main memory region 5c is a memory region on and from which processing information which has been most recently used is written and read according to the processing of the operating system program or the application programs of the CPU 20. Moreover, the video memory region 5d is a region which is provided in order to perform the function of part of the video memory region allocated in the conventional main memory 4 of FIG. 1. That is, the video memory region 5d is a memory area on and from which video information which is used in correspondence to the image processing procedure as the GMCH 30 performs the function of the video processing unit (not shown).

It is preferable, but not required, that the remaining memory regions 5a, 5b, . . . , and 5n except for the main memory region 5c and the video memory region 5d among the plurality of memory regions 57, perform the function of the conventional HDD 12 of FIG. 1, and are loaded with the operating system program and application programs. Likewise, the plurality of memory regions 57 of the flash memory 51 has little restriction on the storage capacity of each memory region, to thus easily increase the storage capacity thereof. For example, it would be possible to upgrade the HDD 50, 50' capacity by plugging in a new flash memory for one of the regions 57. Additionally, it is understood that ones of these regions 57 can be replaced or supplemented by other media, such as a conventional HDD, optical media, magnetic media, and/or magnetic optical media.

The controller 55 communicates with the GMCH 30 via the high-speed communications bus "a" and communicates with the ICH 40 via the IDE bus "b". Under the control of the GMCH 30 accessed via the high-speed communications bus "a", the controller 55 controls information stored in at least one of the main memory region 5c and the video memory region 5d to be written and read on and from the HDD 50, respectively. Moreover, under the control of the ICH 40 accessed via the IDE bus "b", the information stored in the rest memory regions 5a, 5b, . . . , and 5n excluding the main memory region 5c and the video memory domain 5d among the plurality of memory regions 57 is controlled to be written and read on and from the HDD 50, respectively.

As described above, the flash memory 51 has little restriction on the storage capacity of the memory region, to thus easily increase the storage capacity thereof. Also, since the flash memory 51 can automatically use corresponding information required for access of the GMCH 30 and the ICH 40 by interface of the controller 55, the writing/reading time of the information is fast. Thus, as described above, in the computer according to an aspect of the present invention, the GMCH 30 and HDD 50 are connected via the high-speed communications bus "a, without having the conventional main memory 4 of FIG. 1 provided in a mainboard (not shown). Also, one region of the flash memory 51 in the HDD 50 is used as a main memory and another region is a video memory. As described above, since the computer uses part of the flash memory 51 of the HDD 50 as the main memory and the video memory, the limitation on the memory storage capacity is effectively overcome, the space of the mainboard (not shown) is saved and an effect of the weight reduction is provided. However, it is understood that in other aspects a main memory, such as a RAM, can be retained on the mainboard, but is supplemented by the flash memory 51.

Figure 3:
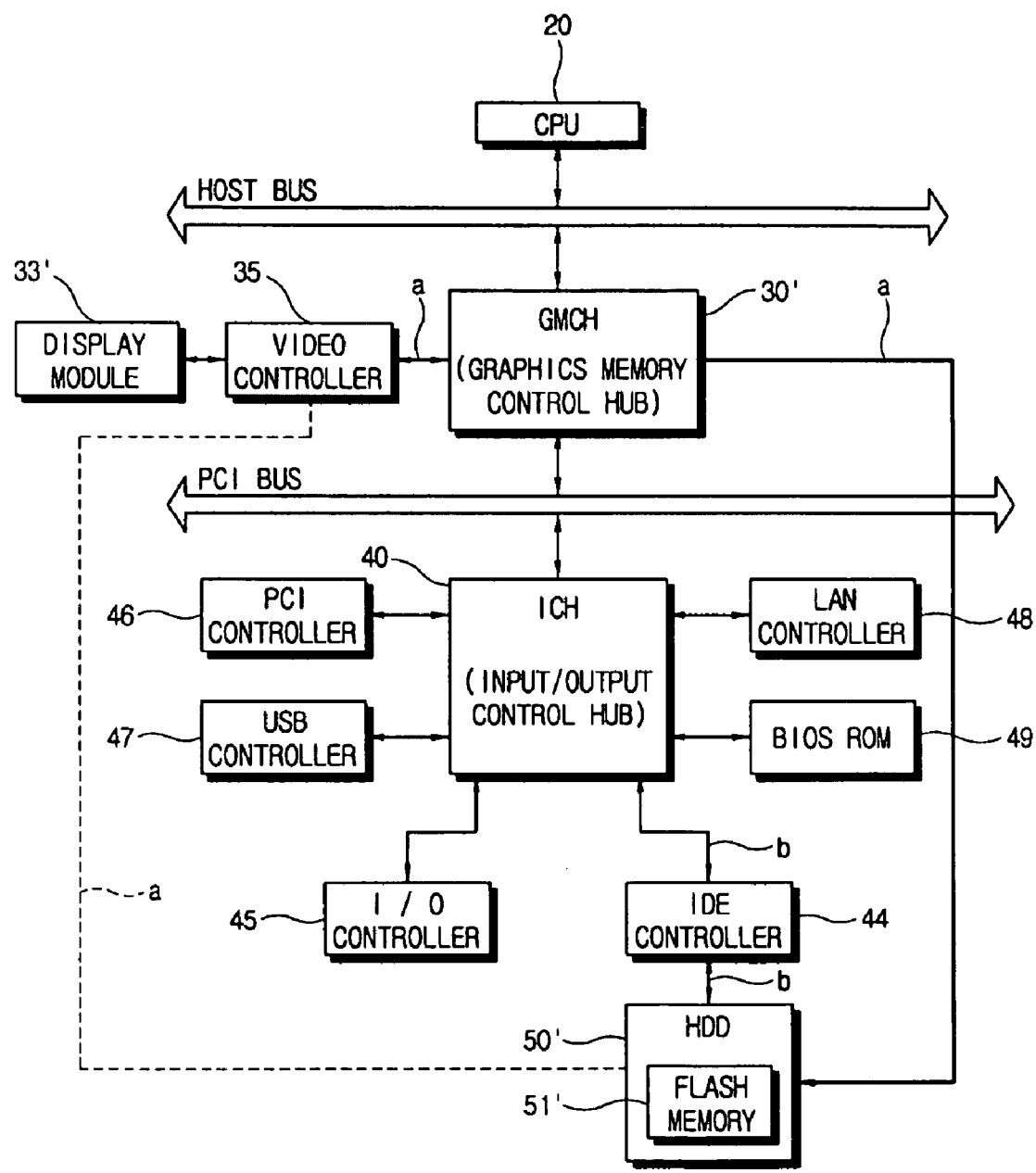
FIG. 3 is a control block diagram of a computer according to an embodiment of the present invention.

Referring to FIG. 3, a computer according to an embodiment of the present invention will be described. Like elements of the embodiment of the present invention in FIG. 2 are denoted as the same reference numerals in the embodiment of the present invention shown in FIG. 3. The detailed description thereof will thus be omitted.

As shown in FIG. 3, the computer includes the CPU 20 which is a processing unit, a GMCH 30' which communicates with a video controller 35 and a HDD 50' while being connected with the CPU 20 via the host bus (HOST BUS). The ICH 40 communicates with the PCI controller 46, the USB controller 47, the LAN controller 48, the BIOS ROM 49, the IO controller 45, and the IDE controller 44 while being connected through the GMCH 30' via the PCI bus (PCI BUS).

The GMCH 30' is a graphics memory control hub including a function of a memory control hub (MCH) to perform a conventional memory-related interface (not shown), and a function of a basic video processing unit (not shown), and thus performs an interface with the HDD 50' and a video controller 35. The GMCH 30' communicates with the HDD 50' at high speed via a high-speed communications bus "a". According to operations of the CPU 20, the GMCH 30' accesses the HDD 50' connected through the high-speed communications bus "a" in order to directly write and read processing information corresponding to information processing procedures of the CPU 20 on and from the HDD 50'.

The video controller 35 controls a display module 33' and is a video processing unit for processing video signals. The video controller 35 can process the video signals at a higher speed than a basic video processing function which is performed by the GMCH 30'. Therefore, the processing of the video signal is mainly or entirely performed by the video controller 35. This video controller 35 accesses the HDD 50' via an interface which is supported by the GMCH 30', to thereby write and read the video information which is used in correspondence to the image processing procedures on and from the HDD 50', respectively.

As shown in FIG. 3, the HDD 50' includes a flash memory 51'. An example of the flash memory 51' will be described referring to FIG. 4. The flash memory 51' includes a controller 55 that communicates with the GMCH 30' via a high-speed communications bus "a." The controller 55 further communicates with the ICH 40 via an IDE bus "b". Under the control of the GMCH 30' accessed via the high-speed communications bus "a", the controller 55 in the flash memory 51' controls information stored in at least one of the main memory region 5c and the video memory region 5d to be written and read on and from the HDD 50', respectively. Moreover, under the control of the ICH 40 accessed via the IDE bus "b", the controller 55 controls the information stored in the rest of the memory regions 5a, 5b, . . . , and 5n other than regions 5c and 5d to be written and read on and from the HDD 50', respectively.

The video controller 35 shows the configuration of accessing the HDD 50' via the GMCH 30', but is only one preferred embodiment. As indicated by a dotted line of FIG. 3, in another aspect, the video controller 35 and the HDD 50' are directly connected via the high-speed communications bus "a", and the video controller 35 directly accesses the HDD 50' in order to write and read the video information on and from the HDD 50', respectively, in correspondence to the image processing procedure of the video controller 35. The video controller can access the HDD 50' using a further bus in other aspects of the invention.

As described above, the computer according to aspects of the present invention does not include a conventional main memory 4 of FIG. 1 which is provided in a mainboard (not shown), and/or allocates the main memory region 5c and a the memory region 5d in part of a flash memory 51 or 51' in a HDD 50 or 50'. Thus, in the computer of aspects of the present invention, the HDD 50 or 50' is accessed via a high-speed communications bus "a" to thereby use the main memory region 5c and the video memory region 5d of the flash memory 51 or 51' as the conventional main memory and video memory. Thus, the computer according to aspects of the present invention effectively overcomes the limit on the memory storage capacity, provides effects of the space saving of the mainboard (not shown) and/or the weight reduction thereof. That is, as described above, aspects of the present invention provide a computer which effectively overcomes the limit on a memory storage capacity, saves the space of a mainboard and/or reduces the weight thereof.

Although a few embodiments of the present invention have been shown and described, it will be appreciated by those skilled in the art that changes may be made in these embodiments which vary voltage supplied to stabilize voltage of a switching unit without departing from the principles and spirit of the invention, the scope of which is defined in the appended claims and their equivalents.

What is claimed is:

1. A computer connectable to a peripheral device and a display, the computer comprising:
a main memory comprising a main memory unit, a secondary memory unit and a memory controller for accessing the main memory unit and the secondary memory unit;
a graphics controller connected to the memory controller using a first connection, wherein the graphics controller accesses data located in the main memory unit to perform graphics processing and outputs processed display data to a display;
a second controller connected to the memory controller using a second connection other than the first connection; and
a central processing unit to control an operation of the computer, to control the graphics controller to access the memory controller through the first connection, to control the graphics controller to output the display data to be displayed, and to control the second controller to access data located in the secondary memory unit using the second connection.

2. The computer of claim 1, wherein the main memory comprises a flash memory.

3. The computer of claim 2, wherein during use of the computer, the central processing unit recalls an operating system from the secondary memory unit, stores the operating system in the main memory unit, and uses the operating system stored in the main memory unit to control the operation of the computer.

4. The computer of claim 2, wherein during use of the computer, the central processing unit recalls an application program from the secondary memory unit, stores the application program in the main memory unit, and uses the application program stored in the main memory unit to control the operation of the computer to execute the application program.

5. The computer of claim 2, wherein the flash memory comprises a main memory region used by the central processing unit as a main memory through the first connection, and a graphics region used by the graphics controller for image processing through the first connection.

6. The computer of claim 5, wherein the secondary memory comprises a hard disc drive used by the second controller to access stored data.

7. The computer of claim 5, wherein the flash memory comprises the secondary memory used as a hard disc drive used by the second controller to access stored data.

8. The computer of claim 1, wherein the main memory unit further comprises a flash memory and the secondary memory unit comprises another flash memory.

9. The computer of claim 1, further comprising a main board on which is mounted the central processing unit, wherein the main memory unit is not included on the main board.

10. The computer of claim 1, wherein the first connection has a connection speed that is other than a connection speed of the second connection.

11. The computer of claim 10, wherein the first connection comprises a first bus and the second connection comprises a second bus other than the first bus.

12. The computer of claim 11, wherein the first connection does not include the second bus.

13. The computer of claim 10, wherein the first connection has a greater speed than the second connection.

14. The computer of claim 1, wherein the central processing unit loads an operating system of the computer into the main memory unit while the computer is booted up and operated.

15. The computer of claim 14, wherein the central processing unit stores the data not being currently accessed in the secondary memory.

16. The computer of claim 1, further comprising a graphics memory control hub controlled by the graphics controller to access the main memory unit using the first connection and which is controlled by the central processing unit to access the main memory unit.

17. The computer of claim 1, further comprising a graphics memory control hub controlled by the graphics controller to access the main memory unit using a third connection other than the first and second connections and which is controlled by the central processing unit to access the main memory unit.

18. The computer of claim 1, wherein the second controller comprises a peripheral device controller which further coordinates communication between the central processing unit and one or more peripheral devices.

19. The computer of claim 18, wherein the peripheral devices comprise combinations of a PCI controller, a USB controller, an I/O controller, a LAN controller, a BIOS ROM, and an IDE controller connected to the secondary memory unit.

20. A computer comprising:
   a processing unit;
   a hard disk drive having a memory controller and a main memory region with respect to which processing information used in correspondence with processing procedures of the processing unit is directly accessed;
   a control unit which communicates with the memory controller of the hard disk drive at high speed, for controlling the high speed access with respect to the hard disk drive; and
   a communications bus which provides a high speed connection between the memory controller of the hard disk drive and the control unit.

21. The computer of claim 20, wherein the hard disk drive comprises a built-in flash memory.

22. The computer of claim 21, wherein the main memory region is provided in the flash memory.

23. The computer of claim 21, wherein the flash memory comprises:
   a plurality of memory regions including the main memory region and which are corrected in units of a block, as non-volatile memories,
   wherein the memory controller controls information stored in the main memory region among the plurality of memory regions through high-speed mutual communications with the control unit.

24. The computer of claim 23, wherein the control unit comprises a graphics memory control hub (GMCH) which is connected to the hard disk drive through a communications bus to provide high speed communication with the memory controller and is accessed by the memory controller according to all operations of the processing unit.

25. The computer of claim 23, further comprising a video processing unit for processing video signals, wherein the plurality of memory regions comprises a video memory region with respect to which video information used in correspondence to an image signal processing procedure of the video processing unit is transferred.

26. The computer of claim 25, wherein the control unit accesses the memory controller under the control of the video processing unit to directly transfer the video signal between the video memory region and the control unit.

27. The computer of claim 26, wherein the memory controller controls the information stored in at least one of the main memory region and the video memory region in the plurality of memory regions through high-speed mutual communications with the control unit.

28. The computer of claim 23, further comprising an input/output control hub (ICH) interconnecting input signals between various neighboring peripheral devices in the computer, wherein the memory controller is connected to the input/output control hub through IDE communications, to thereby control the information stored in the plurality of memory regions through communications with the input/output control hub.

29. A hard disc drive for use with a computer connectable to a peripheral device and a display, the hard disc drive comprising:
   a main memory having located therein a main memory unit and a secondary memory unit; and
   a memory controller which controls access to the main memory unit by a graphics controller of the computer and which is connected to the graphics controller using a first connection for outputting processed display data from the main memory unit, and controls access to the second memory unit by a second controller of the computer and which is connected to the second controller to access data located in the secondary memory unit using a second connection other than the first connection.

30. The hard disc drive of claim 29, wherein the main memory comprises a flash memory.

31. The hard disc drive of claim 30, wherein during use of the computer, a central processing unit recalls an operating system from the secondary memory unit, stores the operating system in the main memory unit, and uses the operating system stored in the main memory unit to control the operation of the computer.

32. The hard disc drive of claim 30, wherein during use of the computer, a central processing unit recalls an application program from the secondary memory unit, stores the application program in the main memory unit, and uses the application program stored in the main memory unit to control the operation of the computer to execute the application program.

33. The hard disc drive of claim 30, wherein the flash memory comprises a main memory region used by the central processing unit as a main memory through the first connection, and a graphics region used by the graphics controller for image processing through the first connection.

34. The hard disc drive of claim 29, wherein the main memory unit comprises a flash memory and the secondary memory unit comprises another flash memory.

35. The hard disc drive of claim 29, wherein the first connection has a connection speed that is other than a connection speed of the second connection.

36. The hard disc drive of claim 35, wherein the first connection comprises a first bus and the second connection comprises a second bus other than the first bus.

37. The hard disc drive of claim 36 wherein the first connection does not include the second bus.

38. The hard disc drive of claim 35, wherein the first connection has a greater speed than the second connection.

39. The hard disc drive of claim 29, wherein the secondary memory stores data not being currently accessed by a central processing unit of the computer.

* * * * *